United States Patent
Cummins

[15] 3,693,998
[45] Sept. 26, 1972

[54] CASTERED PLATFORM-TYPE PLAY EXERCISER

[72] Inventor: Alfred B. Cummins, 401 Miles Run, Chagrin Falls, Ohio 44022

[22] Filed: Oct. 2, 1970

[21] Appl. No.: 77,636

[52] U.S. Cl.............280/87.01, D34/15, 272/1 R, 272/57 R, 273/128 R
[51] Int. Cl...........................B62b 11/00, B62k 9/00
[58] Field of Search...280/87.01, 87.04; 9/11 A, 1 R; 272/1 R, 57 R, 33 A; 273/128 R; D34/15, 5; 104/53

[56] References Cited

UNITED STATES PATENTS

| | | | |
|---|---|---|---|
| 3,197,227 | 7/1965 | Anselmo | 280/87.01 |
| 2,720,664 | 10/1955 | Gray | 9/11 A |
| 2,804,123 | 8/1957 | Kling | 272/33 A |
| 3,339,939 | 9/1967 | Bowers | 280/87.01 |
| 3,080,584 | 3/1963 | Brown | 9/1 A X |
| 3,592,468 | 7/1971 | Simendinger | 9/11 A X |
| D219,157 | 11/1970 | Barnes | D34/5 |

Primary Examiner—Leo Friaglia
Attorney—Baldwin, Egan, Walling & Fetzer

[57] ABSTRACT

A play and exerciser attachment for use with a used automobile tire is presented. A generally circular platform of wood, plastic, metal or the like, having a diameter greater than the bead of the tire and less than the outside diameter of the tire is secured thereto, in the present case, by rope laces (for non-wearing yield) passed through holes drilled in the tire. Universal swiveling casters are mounted to the underside of the platform to support the entire device on a flat surface so that it rolls easily in any direction. Preferably a brake is mounted on the platform adapted to be moved into engagement with the flat supporting surface such as a floor by the use of the hand or foot of the operator so as to aid in control of the movement of the exerciser device.

2 Claims, 3 Drawing Figures

PATENTED SEP 26 1972 3,693,998

INVENTOR.
ALFRED B. CUMMINS
BY
Baldwin, Egan, Walling & Fetzer
ATTORNEYS

CASTERED PLATFORM-TYPE PLAY EXERCISER

An object of the present invention is to assemble a few simple parts which can be readily attached to a used automobile tire so as to provide a rolling platform on which an operator may stand or sit while indulging in play and exercise. The device develops the strength and balance of the user, while at the same time providing a novel play device.

The novel features of this invention will be better understood from the accompanying drawings and specification and the essential features thereof will be set forth in the attached claims.

In the drawings,

FIG. 2 is a bottom plan view of the same taken along the line 2—2 of FIG. 1; while

Figure 1:
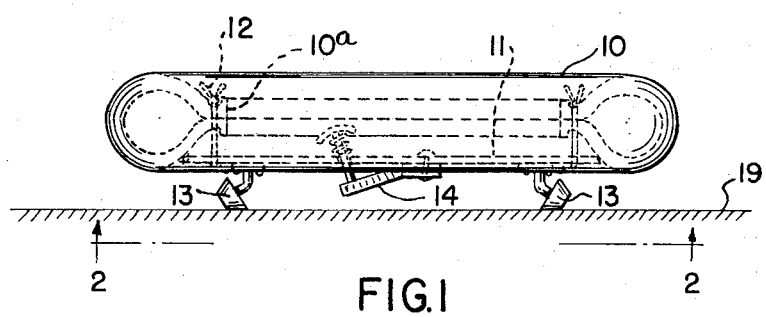
FIG. 1 is a side elevational view of the device of this invention resting upon a flat supporting surface.
Figure 2:
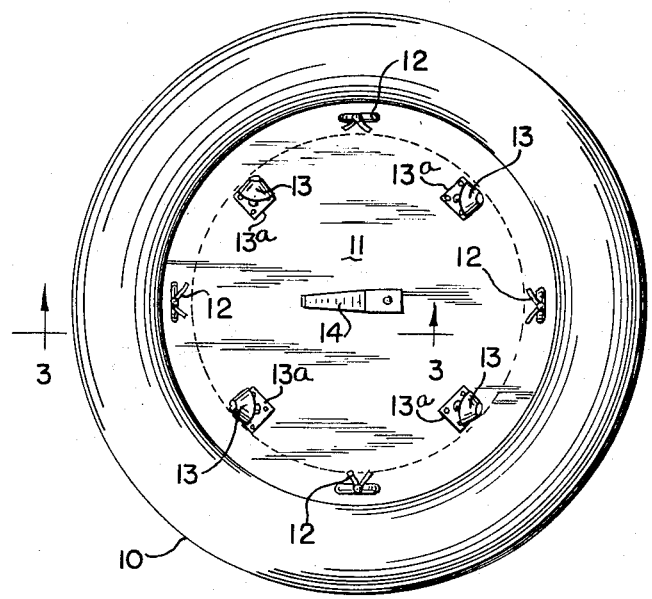

In the drawings, a used passenger car tire is indicated at 10, in this embodiment the tire being of 14 inches diameter. A generally circular platform 11 of plywood, Formica, plastic, metal, or the like, is secured to the tire in position to be on the underside of the tire when the device is in use. This platform 11 is of a diameter greater than the inside diameter of the bead portions 10a but less than the outside diameter of the tire tread, and preferably of such a diameter as to lie radially inside the point of greatest bulge of the tire tread. In the embodiment shown, the platform is about 17 inches in diameter and approximately ¾ inch thick.

Any suitable means may be utilized to secure the platform to the tire but in the embodiment shown, four pairs of holes of approximately ½ inch diameter were drilled through the portion of the tire just radially outside of the beads, and similar registering holes in the platform 11, and then lengths of sisal rope 12 were passed through the holes in the platform and through the two opposed portions of the tire and the rope was then tied completing the four connections. This holds the two beads 10a together and the platform 11 firmly in position with its lower face tight against the tire. With the two bead portions laced tight together, the sisal rope provides lateral slippage and stretch to absorb impact shock without damage to the exercise unit or to the player, after which restoration of the parts to normal position is assured. Four casters 13, mounted for universal swiveling in bases 13a, are secured to the underside of the platform 11 by screwing or bolting the bases 13a to the platform.

Figure 3:
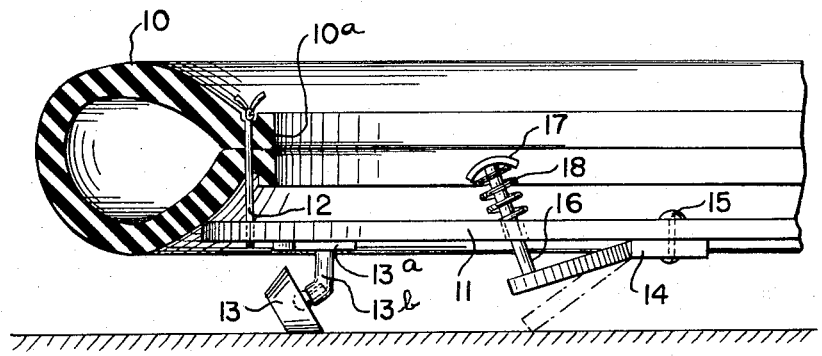
FIG. 3 is an enlarged fragmental sectional view taken along the line 3—3 of FIG. 2.

If a brake is desired, the drawings show a length 14 of fairly stiff rubber or plastic, or other similar material, having one end secured to the platform 11, as by rivet 15, and the other end having secured thereto a brake pedal rod 16 preferably having a manipulator knob or end 17 which is easily actuated by the operator standing on platform 11. A helical spring 18 is held between the knob 17 and the surface of platform 11 so as to normally hold the brake free of the supporting floor 19 as shown in FIG. 3, but movable to the dot-dash position of the same drawing to stop the rolling movement of the apparatus on the floor as supported by the casters 13.

The entire device is so arranged as to support the tire 10 fairly close to the floor, preferably a distance of the order of 3 to 6 inches, flexible enough to touch the floor as a player may stand and use braking action to change direction.

The casters used in this invention may be of any type having a universal swiveling motion, but those shown here are those known as "Flying Saucer" swivel coaster casters where the shank 13b has a ball and socket connection with the caster 13. The casters hold the tire 10 and platform 11 clear of the floor 19 so that the assembled device may scoot in any or all directions about the floor. While four casters are shown in the accompanying drawings, it will be understood that at least three casters are necessary to support the platform 11 parallel to the floor 19.

This invention may be used in a number of ways for play or for exercise. For instance, two players, using two of these devices, may squat on the platform 11 or place their knees on the tire 10 and propel themselves about the floor 19 with one or two pusher poles having hand grips at the top and rubber tipped ends at the bottom. The aim in this case would be to push the opponent over a line, or outside of a limited area. Experienced players may stand on the platform 11, aided by an inverted U-shape support - pusher which may be gripped at the top of the device with rubber balls or tips at the two ends of the U-shape to push against the floor. Another use of this invention is for two players to utilize a third unit constructed according to this invention as a large "puck." In this case, the opponents strive to push the puck over the other person's goal line. This invention may also be utilized by one person using a second floater unit which the player tries to move toward a selected target. For leg building, two of the units of this invention may be tied together a short distance apart and the user stands with one foot on the platform 11 of each unit. The effort to move the two units over a floor surface induces maximum and unusual demands on the seldom used muscles and ligaments, meanwhile taxing the user's sense of balance. Body development, especially that of the upper body, is spectacular in young people.

Thus, using an old automobile tire shoe and relatively inexpensive parts, one may construct an unusual play and exerciser device.

What is claimed is:

1. In combination, an annular tire shoe or casing having radially innermost opposed bead portions, a generally circular platform on one side of said shoe and having a diameter greater than the inside diameter of said bead portions and less than the outside diameter of said shoe, means fastening said platform with one side thereof firmly held against said shoe and with the shoe beads drawn together, at least three casters secured to the other side of said platform and when said shoe is horizontal said casters extending downwardly below the profile of said shoe sufficiently to engage and to roll upon a flat supporting surface parallel to said platform, the difference in shoe radius and platform radius ensuring shoe overhang beyond said platform such that pressure, such as a player rolling off said platform during impact, forces said shoe to the floor to stop action and prevent injury, and permitting a player to position his knees on the upper tire sidewall and to press the lower overhanging side wall to the floor whereby to employ pressure contacts for quick change of direction.

2. In combination, an annular tire shoe or casing having radially innermost opposed bead portions, a generally circular platform on one side of said shoe and having a diameter greater than the inside diameter of said bead portions and less than the outside diameter of said shoe, means fastening said platform with one side thereof firmly held against said shoe and with the shoe beads drawn together, at least three casters secured to the other side of said platform and when said shoe is horizontal said casters extending downwardly below the profile of said shoe sufficiently to engage and to roll upon a flat supporting surface parallel to said platform, said fastening means comprising rope passing through registering openings in sidewalls of said shoe and in said platform, so laced together that lateral slippage and stretch absorbs impact shock without damage to the combination or to a player thereon, after which restoration of the parts to normal position is assured.

* * * * *